(12) United States Patent  
Nefian et al.

(10) Patent No.: US 7,454,342 B2  
(45) Date of Patent: Nov. 18, 2008

(54) COUPLED HIDDEN MARKOV MODEL (CHMM) FOR CONTINUOUS AUDIOVISUAL SPEECH RECOGNITION

(75) Inventors: Ara Victor Nefian, Fremont, CA (US); Xiaoxing Liu, Beijing (CN); Xiaobo Pi, Beijing (CN); Luhong Liang, Beijing (CN); Yibao Zhao, Beijing (CN)

(73) Assignee: Intel Corporation, Santa Clara, CA (US)

( * ) Notice: Subject to any disclaimer, the term of this patent is extended or adjusted under 35 U.S.C. 154(b) by 971 days.

(21) Appl. No.: 10/392,709

(22) Filed: Mar. 19, 2003

(65) Prior Publication Data

US 2004/0186718 A1    Sep. 23, 2004

(51) Int. Cl.  
*G10L 15/14* (2006.01)

(52) U.S. Cl. ...................................... 704/256

(58) Field of Classification Search ............... None  
See application file for complete search history.

(56) References Cited

U.S. PATENT DOCUMENTS

| | | | |
|---|---|---|---|
| 6,006,186 A * | 12/1999 | Chen et al. | 704/254 |
| 6,366,885 B1 * | 4/2002 | Basu et al. | 704/270 |
| 6,370,504 B1 * | 4/2002 | Zick et al. | 704/251 |
| 6,516,090 B1 * | 2/2003 | Lennon et al. | 382/173 |
| 6,683,968 B1 * | 1/2004 | Pavlovic et al. | 382/103 |
| 7,065,250 B1 * | 6/2006 | Lennon | 382/224 |
| 2003/0212556 A1 * | 11/2003 | Nefian | 704/256 |
| 2003/0212557 A1 * | 11/2003 | Nefian | 704/256 |
| 2004/0120554 A1 * | 6/2004 | Lin et al. | 382/118 |
| 2004/0131259 A1 * | 7/2004 | Nefian | 382/228 |

OTHER PUBLICATIONS

Liu, et al., "Audio-Visual Continuous Speech Recognition Using A Coupled Hidden Markov Model," International Conference on Spoken Language Processing, ICSLP 2002, Proceedings, Sep. 2002, pp. 213-216.

Liang, et al., "Speaker Independent Audio-Visual Continuous Speech Recognition," IEEE International Conference on Multimedia and Expo, Proceedings, vol. 2, Aug. 26, 2002, pp. 25-28.

Stephane Dupont et al., "Audio-Visual Speech Modeling for Continuous Speech Recognition", IEEE Transactions on Multimedia, vol. 2, No. 3, Sep. 2000, pp. 141-151.

Juergen Luettin et al., "Asynchronous Stream Modeling for Large Vocabulary Audio-Visual Speech Recognition", Ascom Systec AG, IBM Thomas J. Watson Research Center, pp. 4 total, 2001.

Chalapathy Neti et al., "Audio-Visual Speech Recognition". Workshop 2000 Final Report, Oct. 12, 2000.

* cited by examiner

*Primary Examiner*—David D Knepper  
(74) *Attorney, Agent, or Firm*—Blakely, Sokoloff, Taylor & Zafman LLP (57) ABSTRACT

Method and apparatus for an audiovisual continuous speech recognition (AVCSR) system using a coupled hidden Markov model (CHMM) are described herein. In one aspect, an exemplary process includes receiving an audio data stream and a video data stream, and performing continuous speech recognition based on the audio and video data streams using a plurality of hidden Markov models (HMMs), a node of each of the HMMs at a time slot being subject to one or more nodes of related HMMs at a preceding time slot. Other methods and apparatuses are also described.

30 Claims, 9 Drawing Sheets

COUPLED HIDDEN MARKOV MODEL (CHMM) FOR CONTINUOUS AUDIOVISUAL SPEECH RECOGNITION

FIELD

Embodiments of the invention relate to the field of speech recognition systems; and more specifically, to coupled hidden Markov model techniques for evaluating audiovisual material.

BACKGROUND

The success of currently available speech recognition systems is restricted to relatively controlled environments and well defined applications, such as dictation or small to medium vocabulary voice based control command (e.g., hands free dialing, etc.). In recent years, together with the investigation of several acoustic noise reduction techniques, the study of systems that combine the audio and visual features emerged as an attractive solution to speech recognition under less constrained environments. A number of techniques have been presented to address the audio-visual integration problem, which can be broadly grouped into feature fusion and decision fusion methods.

However, the feature fusion method can suffers from the over-fitting problems, and the decision fusion method cannot capture entirely the dependencies between the audio and video features. In an audiovisual feature fusion system, the observation vectors are obtained by the concatenation of the audio and visual observation vectors, followed by a dimensionality reduction transform. The resulting observation sequences are then modeled using one hidden Markov model (HMM). However, this method cannot model the natural asynchrony between the audio and visual features. Decision fusion systems on the other side model independently the audio and video sequences and enforce the synchrony of the audio and visual features only at the model boundaries. These systems fail to capture entirely the dependencies between the audio and video features. The feature fusion system using a multi-stream HMM assumes the audio and video sequences are state synchronous, but allows the audio and video components to have different contributions to the overall observation likelihood.

BRIEF DESCRIPTION OF THE DRAWINGS

The invention may best be understood by referring to the following description and accompanying drawings that are used to illustrate embodiments of the invention. In the drawings.

DETAILED DESCRIPTION

A coupled hidden Markov model (CHMM) for continuous audiovisual speech recognition is described herein. In the following description, numerous specific details are set forth. However, it is understood that embodiments of the invention may be practiced without these specific details. In other instances, well-known circuits, structures and techniques have not been shown in detail in order not to obscure the understanding of this description.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

Embodiments of the present invention also relate to apparatuses for performing the operations described herein. An apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as Dynamic RAM (DRAM), EPROMs, EEPROMs, magnetic or optical cards, or any type of media suitable for storing electronic instructions, and each of the above storage components is coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods. The structure for a variety of these systems will appear from the description below. In addition, embodiments of the present invention are not described with reference to any particular programming language. It will be appreciated that a variety of programming languages may be used to implement the teachings of the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1A:
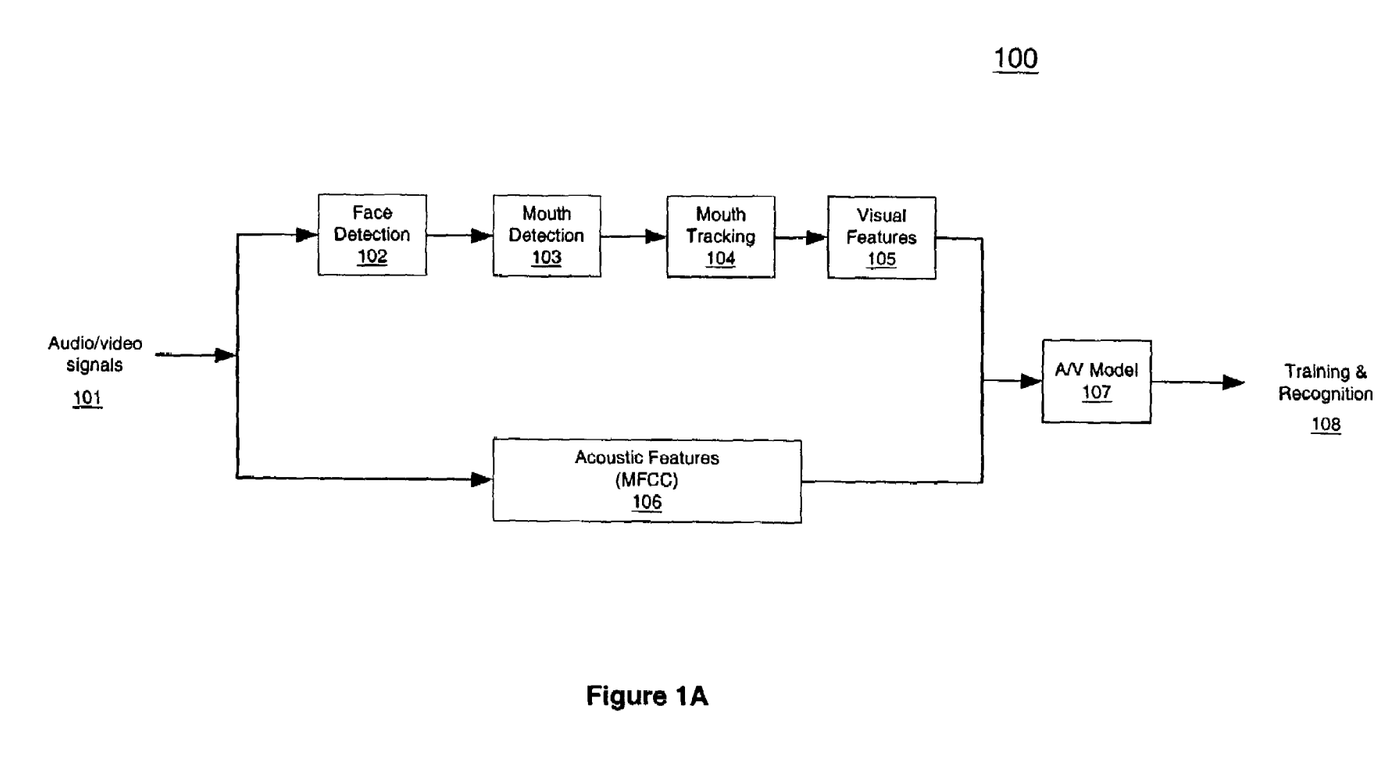
FIG. 1A is a block diagram illustrating an exemplary embodiment of an audiovisual continuous speech recognition (AVCSR) system.

FIG. 1A is a block diagram illustrating an embodiment of an audiovisual continuous speech recognition (AVCSR) system. In one embodiment, system 100 includes face detection module 102, mouth detection module 103, mouth tracking module 104, visual feature extraction module 105, acoustic feature extraction module 106, and audiovisual model module 107.

As seen with respect to the block diagram of FIG. 1A, the audiovisual speech recognition system 100 is capable of implementation on a computer based audiovisual recording and processing system. Separate or integrated cameras and audio systems for audiovisual recording of both facial features and speech of one or more speakers, in real-time or as a recording for later speech processing may be provided, but they are not pertinent to the embodiments of the invention. Audiovisual information may be recorded and stored in an analog format, or preferentially, may be converted to a suitable digital form, including but not limited to MPEG-2, MPEG-4, JPEG, Motion JPEG, or other sequentially presentable transform coded images commonly used for digital image storage. Low cost, low resolution CCD (coupled charged device) or CMOS based video camera systems can be used, although video cameras supporting higher frame rates and resolution may be useful for certain applications. Audio data may be acquired by low cost microphone systems and may be subjected to various audio processing techniques to remove intermittent burst noise, environmental noise, static, sounds recorded outside the normal speech frequency range, or any other non-speech data signal.

According to one embodiment, the captured (stored or real-time) audiovisual data 101 is separately subjected to audio processing via acoustic feature processing module 106 using techniques well known in the art, such as, for example, MFCC (Mel Frequency Cepstral Coefficients) feature extraction. In addition, the captured audiovisual data may be subject to visual feature extraction, such as face detection, mouth detection, mouth tracking, and visual feature extraction which may be performed by face detection module 102, mouth detection module 103, mouth tracking module 104, and visual feature extraction module 105 respectively. Two or more data streams are integrated using an audiovisual fusion model, such as A/V model 105, and a training network and speech recognition module 108 is used to yield a desired text data stream reflecting the captured speech. Data streams may be processed in near real-time on sufficiently powerful computing systems. Alternatively, data streams may be processed after a delay or in batch mode, or the data streams may be processed on multiple computer systems or parallel processing computers, or processed using any other suitable mechanism available for digital signal processing.

Software implementing suitable procedures, systems and methods can be stored in the memory of a computer system as a set of instructions to be executed. In addition, the instructions to perform procedures described above could alternatively be stored on other forms of machine-readable media, including magnetic and optical disks. For example, the method of may be stored on machine-readable media, such as magnetic disks or optical disks, which are accessible via a disk drive (or computer-readable medium drive). Further, the instructions can be downloaded into a computing device over a data network in a form of compiled and linked version. Alternatively, the logic could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

Figure 1B:
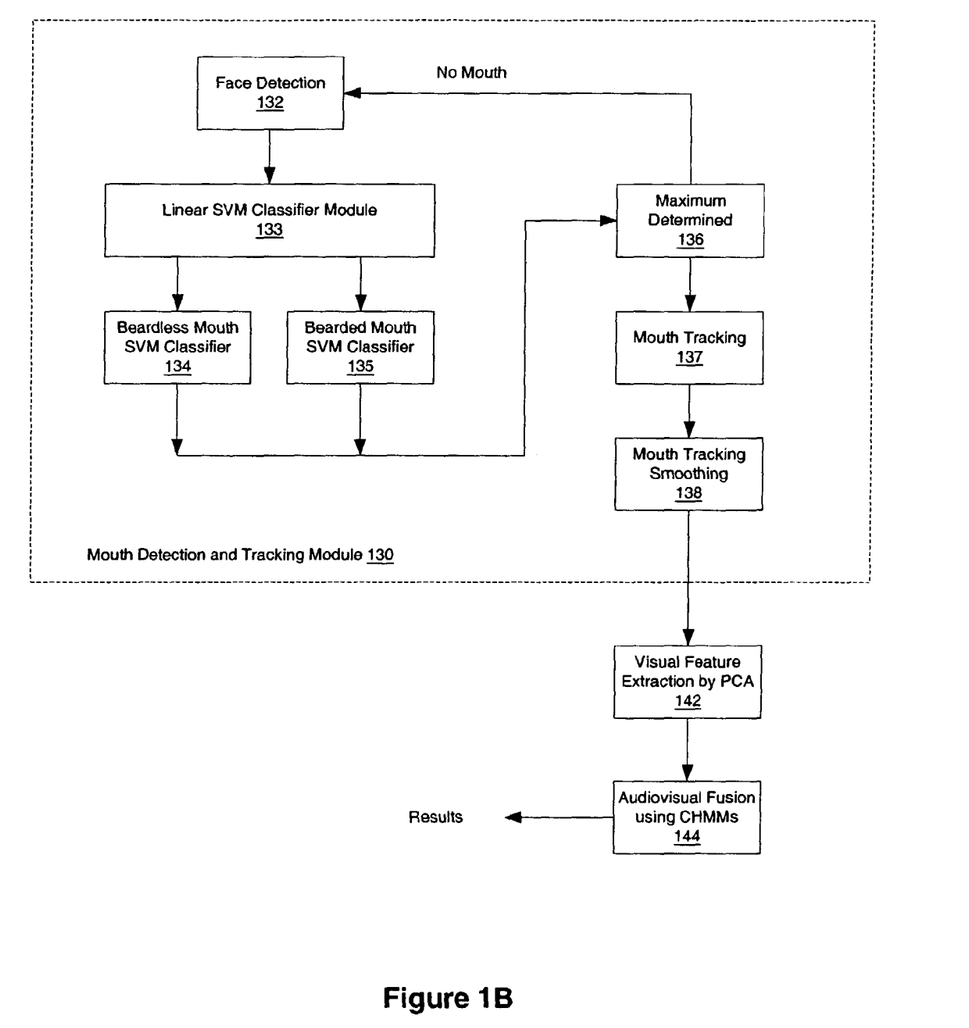
FIG. 1B is a block diagram illustrating an exemplary embodiment of mouth detection and tracking modules of an audiovisual continuous speech recognition (AVCSR) system.

FIG. 1B is a block diagram illustrating an exemplary embodiment of mouth detection and tracking modules, which may be, used as mouth detection module 103 and mouth tracking module 104. Referring to FIG. 1B, mouth detection and tracking module 130 includes face detection 132 of the speaker's face in a video sequence. In one embodiment, the face detection may be performed by a separate module, such as, for example, face detection module 102 of FIG. 1A. The mouth detection and tracking module 130 may also include a Linear SVM (support vector machine) Classifier Module 133, a mouth classifier 134, a mouth/beard classifier 135, a maximum matching score selection module 136, a mouth tracker 137, and a mouth tracker smoothing module 138.

Various face detecting procedures or algorithms may be suitable for face detection 132, including, but not limited to, pattern matching, shape correlation, optical flow based techniques, or hierarchical segmentation. In one embodiment, a suitable face detection procedure requires a use of a Gaussian mixture model to model the color distribution of a face region. The generated color distinguished face template, along with a background region logarithmic search to deform the template and fit it with the face optimally based on a predetermined target function, may be used to identify single or multiple faces in a visual scene. In another embodiment, neural network based techniques may be used for face detection.

After the face is detected, mouth region discrimination may be required, since other areas of the face generally have low or minimal correlation with speech. Since the search area for the mouth is significantly reduced by the results of the face detection, a cascade of support vector machine (SVM) classifiers 133 may be used to locate the mouth within the lower region of the face. The SVM cascade (using two or more standard SVM classifiers) is computationally efficient and facilitates accurate real time system operation of the mouth recognition. Typically, first SVM classifier finds the coarse region of the mouth. A typical size of the sub-images used in training the classifier at this stage is 16×16 pixels. The sub image is obtained through down sampling of the mouth training set. Most of the remaining regions other than the mouth region are removed by the classifier. However, several "false alarms" may be passed as true positions of the mouth. The role of the second SVM classifier (trained on mouth regions of size 32×32 pixels) is to look at the regions classified as mouth by the first SVM and further remove all the false alarms. Generally, the first SVM classifier is faster and the second one is more precise.

To adapt to scale variations, a multi-scale search in an estimated range is implemented, with repeated re-sampling of a source image by a constant factor. A preprocessing step normalizes source images with respect to variations in illumination via histogram equalization and gradient illumination correction. Next, a SVM filter of size 16×14 pixels with linear kernel can be applied to a lower region of the face to determine the coarse location of the mouth. Finally, two SVM classifiers with Gaussian kernel of size 32×28 pixels, trained on examples of mouth regions with and/or without facial hair, are applied to each test pattern and its rotated versions in the image plane. The highest mouth classification score among all rotated patterns and SVM classifiers is used to determine the refined location of the mouth. The positive examples used for the training of the SVM filters consist of a set of manually labeled mouth images and a set of negative examples (e.g., facial regions other than the mouth region). Using the labeled points in the positive set, including the corners, the upper and lower points, and the center of the mouth, the size of the training set is enhanced with several geometric variations such as scaling, horizontal mirroring and rotations in the image plane. A pre-processing operation consisting of scale normalization, histogram equalization, and illumination correction may be applied to both the positive and the negative examples in the training set. In one embodiment, the Gaussian kernel SVM filters are trained via bootstrapping as follows:

1. Train the SVM filters using the positive and negative training sets,
2. Run the SVM filters on a validation set and enhance both the positive set with undetected mouth regions and the negative set with false alarms, and
3. Repeat operations 1 and 2 until the mouth detector reaches the desired performance.

In one experiment, the training sets obtained after the bootstrapping procedure consist of approximately 8000 non-mouth, 9000 mouth and 6000 mouth-and-beard samples respectively. The mouth samples are obtained by mirroring, rotating, and rescaling of 250 and 800 images of users respectively with beards and without beards.

Following the detection of the face and mouth region and classification by the SVM module and mouth or mouth/beard classifiers 134 and 135, the mouth position is tracked by mouth tracking module 137 over consecutive frames. The center of the mouth is estimated from the previous frame and the mouth detection algorithm is applied to a reduced area around the estimated center of the mouth. If all the test patterns in the search area fail to be assigned to the mouth region, the system re-initializes the face and mouth detection algorithm, or the new mouth center is estimated and the mouth tracking continues. The mouth tracking is further smoothed using a mouth smoothing module 138. A median filter followed by a Gaussian filter can be used by module 138. The approach was tested on a database representing 190 sequences recorded from 95 speakers. The overall accuracy of the mouth detection and tracking system is 95.26%, with 86.67% for the 30 sequences of people wearing beards and 96.88% for the remaining sequences.

After successful operation of mouth tracking module 130, the visual features of the mouth are extracted for processing by a software or hardware module for visual feature extraction module 142 using Principal Component Analysis (PCA). In one embodiment, a set of visual observation vectors are extracted from a 64×64 pixels region centered on the mouth using a cascade algorithm. In one operation, the gray level pixels in the mouth region are mapped to a 32 dimensional feature space using principal component analysis (PCA) mechanism. The PCA decomposition is computed from a set of approximately 200,000 mouth region images obtained from the mouth tracking system 130. The resulting vector of size 32 is upsampled to match the frequency of audio features (e.g., about 100 Hz) and standardized using feature mean normalization or other conventional technique. Next, blocks of N visual observation vectors are concatenated and projected on a 13-class linear discriminant space to obtain a new set of visual observation vectors of size 13. The class information used in linear discriminant analysis corresponds to 13 English visemes (common mouth positions used by English speakers, visual analogs of acoustical phonemes). These visemes are modeled by hidden Markov models with 3 states, 12 Gaussian components per state and diagonal covariance matrix.

After the face detection, processing, and upsampling of data to audio date rates (if necessary), the generated video data may be fused with audio data using a suitable fusion model. In one embodiment, a coupled hidden Markov model (CHMM) is utilized. A CHMM is a generalization of a HMM suitable for a large scale of multimedia applications that integrate two or more streams of data. A CHMM can be seen as a collection of HMMs, one for each data stream, where the discrete nodes at time t for each HMM are conditioned by the discrete nodes at time $t_1$ of all the related HMMs. The CHMM will be described in details further below.

Figure 2:
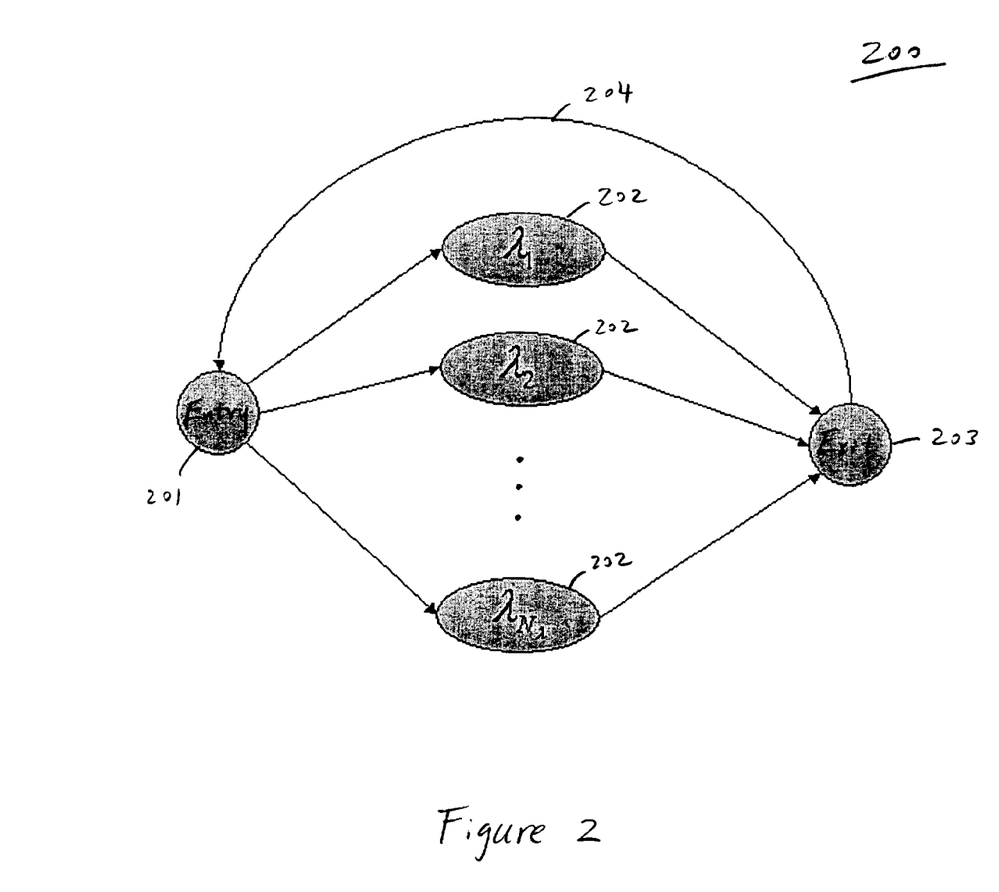
FIG. 2 is a block diagram illustrating an exemplary embodiment of a word network.

FIG. 2 is a block diagram of a word network illustrating the continuous speech recognition process. In one embodiment the nodes of the word network $\lambda_i$ are CHMMs. In one embodiment, network 200 includes an entry node 201 and an exit node 203. Entry node and exit nodes are also referred to as non-emitting nodes which are not associated with the observation.

When a segmented audiovisual data stream is received at entry node 201, the data is matched against the one or more CHMMs based on one or more algorithms which will be described in details further below. The data is then passed to exist node 203 which in turn passes the data to an entry node of another model (e.g., via path 204). Once all likelihoods of the data given all models (e.g., CHMMs) are computed, the most likely sequence of the models is obtained. In one embodiment, the most likely sequence of the models is obtained via a backtracking mechanism, such as a Vterbi algorithm. The most likely sequence represents the recognized speech.

Figure 3:
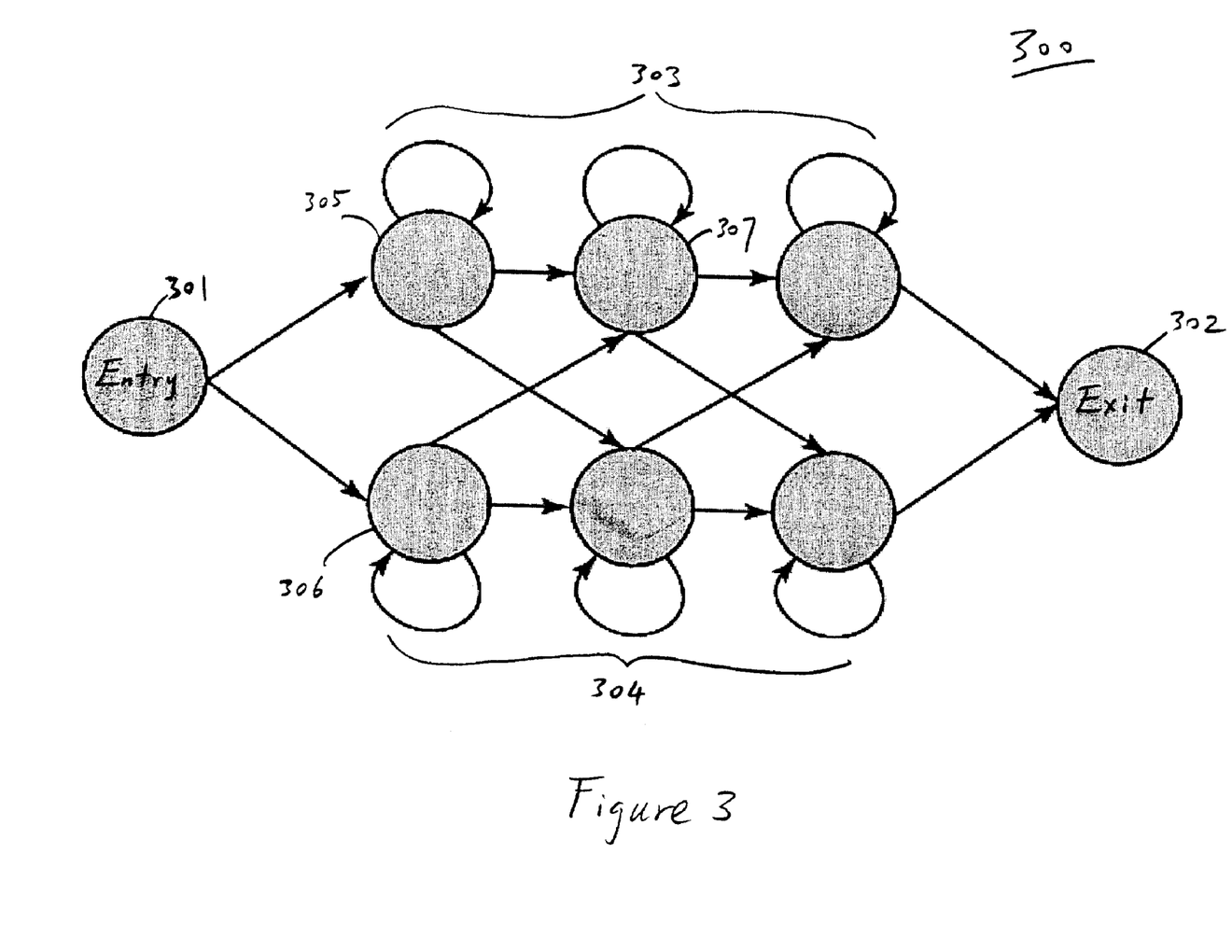
FIG. 3 is a block diagram illustrating a state presentation of an exemplary embodiment of a coupled hidden Markov model (CHMM).

FIG. 3 is a block diagram illustrating state representations of a CHMM in accordance with one embodiment. In this embodiment, referring to FIG. 3, CHMM 300 is a two stream CHMM including an audio stream 304 and a video stream 303. In one embodiment, CHMM 300 includes an entry node 301 and an exit node 302, which are also referred to as non-emitting nodes. In this embodiment, CHMM 300 includes three states represented by three circles between entry node 301 and exit node 302. It will be appreciated that more or less than three states may be included in CHMM 300.

Unlike the independent hidden Markov model (HMM) used for audiovisual data in a conventional approach, the CHMM can capture the interactions between audio and video streams through the transition probabilities between the states. According to one embodiment, each state of CHMM may be subject to conditions of previous states, including audio and video states. For example, state 307 in video stream 303 is subject to the related previous states, such as node 305 of video stream 303 and node 306 of audio stream 304.

According to one embodiment, the audiovisual CHMM allows asynchronous states audio and visual states, such as states 305 to 307 while preserving their natural dependency. The entry node 301 and exit node 302 allow for model concatenation in continuous speech recognition and force the audio and visual state synchrony at the boundaries of the model. In addition with the CHMM, the audio and video observation likelihoods may be computed independently which significantly reduces the parameter space and complexity of the model, as compared to those models that require the concatenation of the audio and visual observations employed by a conventional approach.

Figure 4:
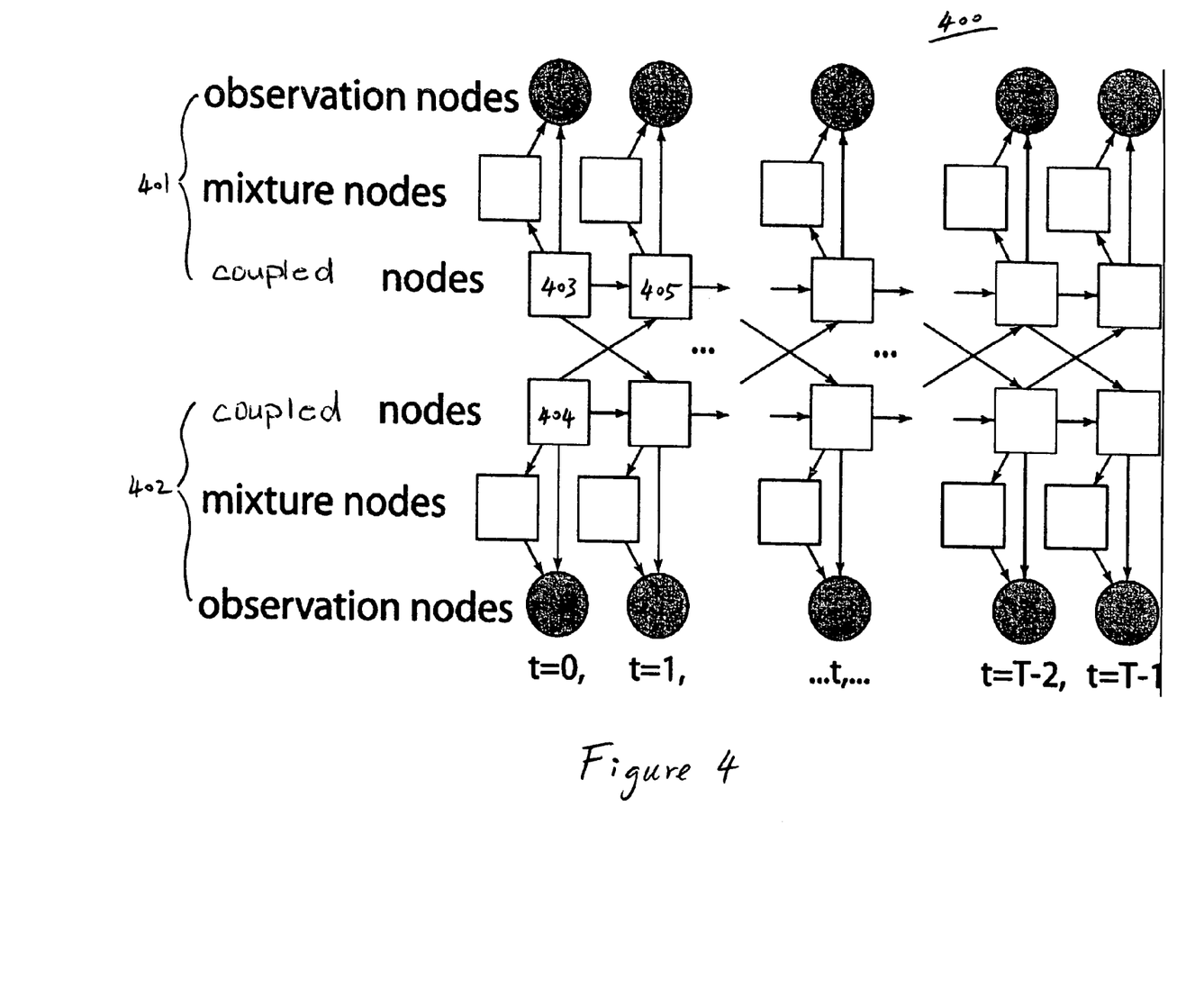
FIG. 4 is a block diagram illustrating an exemplary embodiment of a CHMM.

FIG. 4 is a dynamic Bayesian representation or time representation of a continuous mixture two-stream CHMM which may be used with one embodiment. Block diagram 400 illustrates a continuous mixture two-stream coupled HMM used in an audiovisual speech recognition system. The squares, such as 403-405, represent the hidden discrete nodes while the circles describe the continuous observable nodes. The hidden nodes can be conditioned temporally as coupled nodes and the remaining hidden nodes as mixture nodes.

Referring to FIG. 4, CHMM 400 includes a video stream 401 and an audio stream 402. Each stream includes one or more observation nodes and one or more hidden nodes. The squares represent the hidden discrete nodes while the circles describe the continuous observable nodes. The hidden nodes can be conditioned temporally as coupled nodes and to the remaining hidden nodes as mixture nodes.

According to one embodiment, CHMM 400 captures the interactions between audio and video streams through the transition probabilities between the nodes. According to one embodiment, each node of CHMM at a time may be subject to conditions of all related nodes at a previous time, including audio and video nodes. For example, node 405 in video stream 401 at a time slot (e.g., t=1) is subject to the related nodes at a previous time slot (e.g., t=0), such as node 403 of video stream 401 and node 404 of audio stream 402.

Mathematically, according to one embodiment, the elements of a CHMM may be defined as follows:

$$\pi_o^c(i) = P(q_o^c = i) \qquad (\text{Eq. 1})$$

$$b_t^c(i) = P(O_t^c | q_t^c = i) \qquad (\text{Eq. 2})$$

$$a_{i|j,k}^c = P(q_t^c = i | q_{t-1}^0 = j, q_{t-1}^1 = k) \qquad (\text{Eq. 3})$$

where $q_t^c$ the state of the couple node in the cth stream at time t. $\pi_o^c(i)$ represents an initial condition at cth stream. $b_t^c(i)$ represents an observation probability given observation $O_t^c$ at time t at cth stream and condition $q_t^c = i$. $a_{i|j,k}^c$ represents a transitional probability transitioning from state time t-1 to t, given the conditions of $q_{t-1}^0 = j$ and $q_{t-1}^1 = k$.

In a continuous mixture with Gaussian components, the probabilities of the observed nodes may be provided by:

$$b_t^c(i) = \sum_{m=1}^{M_i^c} w_{i,m}^c N(O_t^c, \mu_{i,m}^c, U_{i,m}^c) \qquad (\text{Eq. 4})$$

where $\mu_{i,m}^c$ and $U_{i,m}^c$ are the mean and covariance matrix of the ith state of a coupled node, and the mth component of the associated mixture node in the cth channel. $M_i^c$ is the number of mixtures corresponding to the ith state of a coupled node in the cth stream and the weight $w_{i,m}^c$ represents the conditional probability $P(s_t^c = m | q_t^c = i)$ where $s_t^c$ is the component of the mixture node in the cth stream at time t. Unlike the isolated word audio-visual speech recognition used in a conventional approach where one CHMM is used to model each audio-visual word, in audio-visual continuous speech recognition, each CHMM models one of the possible phoneme-viseme pairs.

The CHMM requires to be trained to identify phoneme-viseme pairs. Maximum likelihood (ML) training of the dynamic Bayesian networks may be utilized to train the CHMM. Any discrete time and space dynamical system governed by a hidden Markov chain emits a sequence of observable outputs with one output (e.g., an observation) for each state in a trajectory of such states. From the observable sequence of outputs, the most likely dynamical system may be calculated. The result is a model for the underlying process. Alternatively, given a sequence of outputs, the most likely sequence of states may be determined. In audio-visual continuous speech recognition tasks, a database of phoneme-viseme pairs, along with separate training set for each pair, may be generated.

Unfortunately, the iterative maximum likelihood estimation of the parameters only converges to a local optimum, making the choice of the initial parameters of the model a critical issue. An efficient method for the initialization of the ML is required for desirable results. One such method is based on the Viterbi algorithm, which determines the optimal sequence of states for the coupled nodes of the audio and video streams that maximizes the observation likelihood.

According to one embodiment, training of the CHMM's parameters for AVCSR is performed in two stages and may be considered as an extension of the training used in audio-only continuous speech recognition. In the first stage, the CHMM parameters are estimated for isolated phoneme-viseme pairs. In this stage, the training sequences are labeled using an audio-only speech recognition system, and phoneme-viseme correspondence tables, such as those defined by C. Neti, et al., entitled "Audio Visual Speech Recognition", published by Final Workshop 2000 Report, 2000. The parameters of the isolated phoneme-viseme CHMMs may be estimated initially using the Viterbi-based initialization, such as those described by A. V. Nefian, et al., entitled "A Coupled Hidden Markov Model for Audio-visual Speech Recognition", in the International Conference on Acoustics, Speech and Signal Processing, 2002, which is hereby expressly incorporated by reference.

The process may be followed by an estimation-maximization (EM) algorithm well known in the art, such as, for example, those defined by Finn V. Jensen, entitled "An Introduction to Bayesian Networks", published by UCL Press Limited, London, UK, 1998. To deal with the requirements of a continuous speech recognition system, according to one embodiment, two additional CHMMs are trained to model the silence between consecutive words and sentences.

In the second stage, the parameters of the CHMMs, estimated individually in the first stage, are refined through an embedded training of all CHMM from continuous audio-visual speech. In this stage, the labels of the training sequences consist only on the sequence of phoneme-viseme with all boundary information being ignored. In one embodiment, the process may be similar to the embedded training methods for HMMs defined by S. Young, et al., entitled "The HTK Book", published by Entropic Cambridge Research Laboratory, Cambridge, UK, 1995, each of the models obtained in the first stage are extended with one entry and one exit non-emitting states. The use of the non-emitting states also enforces the phoneme-viseme synchrony at the model boundaries.

The embedded training follows the operations of the EM algorithm for continuous audio-visual speech, and may include two sub-stages. In the first sub-stage, the forward $$\text{probability } \alpha_t(i,j) = P(O_1, \ldots, O_t, q_t^0 = i, q_t^1 = j)$$

and the backward probability $$\beta_t(i,j) = P(O_t + 1, \ldots, O_T | q_t^0 = i, q_t^1 = j)$$

are computed. Starting with the initial conditions, such as:

$$\alpha_1(i,j) = \pi_1^0(i)\pi_1^1(j)b_1^0(i)b_1^1(j), \qquad (\text{Eq. 5})$$

the forward probabilities are computed recursively from $$\alpha_t(i, j) = b_{t-1}^0(j)b_{t-1}^1(j)\sum_{l,k} a_{i,j|l,k}\alpha_{t-1}(l, k) \quad \text{(Eq. 6)}$$

for t=2,3, ..., T. Similarly, from the initial conditions $$\beta_T(i,j)=1$$

the backward probabilities are computed recursively from $$\beta_t(i, j) = \sum_{l,k} b_{t+1}^0(l)b_{t+1}^1(k)a_{l,k|i,j}\beta_{t-1}(l, k) \quad \text{(Eq. 7)}$$

for t=T-1, T-2, ..., 1 where i,j are the states of the audio and video chain respectively and $a_{i,j|k,l} = a_{i|k,l}a_{j|k,l}$ is the transition probabilities between the set of audio visual states i, j and k,l. The probability of the rth observation sequence $O^r=[O_1^r, \ldots O_T^r]$ is computed as:

$$P_r = \alpha_T(N,M) = \beta_1(l,l)$$

where N,M are the number of states in the audio and video chain respectively and $T_r$ is the length of the observation sequence $O_r$.

In the second sub-stage, the forward and backward probabilities obtained in the first sub-stage are used to re-estimate the state parameters as follows:

$$\bar{\mu}_{i,m}^c = \frac{\sum_r \sum_t \gamma_t^{r,c}(i, m)O_t^r}{\sum_r \sum_t \gamma_t^{r,c}(i, m)} \quad \text{(Eq. 8)}$$

$$\bar{U}_{i,m}^c = \frac{\sum_r \sum_t \gamma_t^{r,c}(i, m)(O_t^r - \mu_{i,m}^c)(O_t^r - \mu_{i,m}^c)^t}{\sum_r \sum_t \gamma_t^{r,c}(i, m)} \quad \text{(Eq. 9)}$$

$$\bar{w}_{i,m}^c = \frac{\sum_r \sum_t \gamma_t^{r,c}(i, m)}{\sum_r \sum_t \sum_m \gamma_t^{r,c}(i, m)} \quad \text{(Eq. 10)}$$

where $$\gamma_t^{r,c}(i, m) = \frac{\sum_j \frac{1}{P_r}\alpha_t^r(i, j)\beta_t^r(i, j)}{\sum_{i,j} \frac{1}{P_r}\alpha_t(i, j)\beta_t(i, j)} \quad \text{(Eq. 11)}$$

$$\frac{w_{i,m}^c N(O_t^r, \mu_{i,m}^c, U_{i,m}^c)}{\sum_m w_{i,m}^c N(O_t^r, \mu_{i,m}^c, U_{i,m}^c)}$$

The state transition probabilities may be estimated using:

$$\bar{a}_{i|k,l}^{0,1} = \frac{\sum_r \frac{1}{P_r}\sum_t \alpha_t^r(k, l)a_{i|k,l}b_t^{0,1}(i)\sum_j \beta_{t+1}^r(i, j)b_t^{1,0}(j)}{\sum_r \frac{1}{P_r}\sum_t \alpha_t^r(k, l)\beta_t^r(k, l)} \quad \text{(Eq. 12)}$$

Assuming that $a_{i|k,l}^{0,1}=P(q_t^{0,1}=i|q_t^{0,1}=k)$ $P(q_t^{0,1}=k)P(q_t^{0,1}=i|q_t^{1,0}=1)$, the re-estimation of the transition probabilities may be simplified. For example, $P(q_t^0=i|q_t^1=k)$ may be estimated as:

$$P(q_t^0 = i \mid q_t^1 = k) = \quad \text{(Eq. 13)}$$

$$\frac{\sum_r \frac{1}{P_r}\sum_t \sum_j \sum_l \alpha_t^r(k, l)a_{i,j|k,l}b_t^0(i)b_t^1(k)\beta_{t+1}^r(i, j)}{\sum_r \frac{1}{P_r}\sum_t \sum_j \sum_l \alpha_t^r(k, l)\beta_t^r(k, l)}$$

The transitions from a non-emitting entry state i to any pair of audio-visual states (k,l) is given by $$a_{i|k,l} = \frac{1}{R}\sum_r \frac{1}{P_r}\alpha_1^r(k, l)\beta_1^r(k, l) \quad \text{(Eq. 14)}$$

and the transitions from a state pair (k,l) to the exit non-emitting exit state o are given by $$a_{k,l|o} = \frac{\sum_r \frac{1}{P_r}\alpha_T^r(k, l)\beta_T^r(k, l)}{\sum_r \frac{1}{P_r}\sum_t \alpha_t^r(k, l)\beta_t^r(k, l)} \quad \text{(Eq. 15)}$$

According to one embodiment, the audiovisual continuous speech recognition may be carried out via a graph decoder applied to a word network, such as word network 200 shown in FIG. 2, consisting of all the words in a dictionary. Each word in the word network may be stored as a sequence of phoneme-viseme CHMMs, and the best sequence of the words may be obtained through an extension of a token passing algorithm applied to audiovisual data. The token passing algorithm may be selected from those defined by S. Young, et al., entitled "HTK Book". Alternatively, the token passing algorithm may be selected from those defined by M. Oerder, et al., entitled "Word Graphs: An efficient Interface Between Continuous-Speech Recognition and Language Understanding", published by IEEE International Conference on Acoustics, Speech and Signal Processing, vol. 2, 1993.

To handle different levels of noise in an audio channel, the audio and video observation probabilities are modified such that:

$$b_t^{a,1}(i)=[b_t^{0,1}(i)]^{\alpha_{0,1}}$$

where $\alpha_0+\alpha_1=1$ and $\alpha_0, \alpha_1 >=0$ are the exponents of the audio and video streams respectively. The values $\alpha_0$ and $\alpha_1$ corresponding to a specific acoustic SNR (signal-to-noise ratio) level are obtained experimentally to minimize the average word error rate.

Experiments for audiovisual continuous speech recognition system have been performed on some well known databases, such as XM2VTS database presented by J. Luettin, et al., entitled "Evaluation Protocol for the XM2FDB Database", in IDIAP-COM 98-05, 1998.1 In the experiments, a set of approximate 1450 digit enumeration sequences captured from approximate 200 speakers are utilized for training and a set of approximate 700 sequences from other approximate 95 speakers are utilized for decoding. The training sequences are recorded with "clean" audio (e.g., SNR of approximate 30 dB). The audio data of the experimental sequences is corrupted with several levels of noise, such as white noise, to allow the study of AVSR under less constrained acoustic conditions.

In one experiment, the acoustic observation vectors includes 13 MFCC coefficients, extracted from a window of approximate 25.6 milliseconds (ms), with an overlap of approximate 15.6 ms, with their first and second order time derivatives. The visual features are obtained from a mouth region using one of the aforementioned methods, and particularly, they may be obtained via a cascade algorithm, such as those defined by A. V. Nefian, entitled "Speaker Independent Audio-Visual Continuous Speech Recognition", in the International Conference on Multimedia and Expo, 2002, which is hereby expressly incorporated by reference.

The extraction of the visual features starts with a neural network based face detection system followed by a detection and tracking of a mouth region using a set of support vector machine classifiers. The pixels in the mouth region are mapped to a 32-dimensional feature space using a principal component analysis. Blocks of approximate 15 visual observation vectors are then concatenated and projected on a 13-class linear discriminant space, such as those defined by R. O. Duda, et al., entitled "Pattern Classification", published by John Wiley Sons, Inc., New York, N.Y., 2000. The resulting vectors of size 13 and their first and second order time derivatives are used as visual observation sequences. The audio and visual features are integrated using a CHMM with three states in both audio and video chains with no back transitions, with 32 mixtures per state, and diagonal covariance matrix, as discussed above.

The word error rate (WER) of the experimental audiovisual speech recognition system for several SNR levels are described as follows:

TABLE 1

| | SNR (db) | | | | | | | |
|---|---|---|---|---|---|---|---|---|
| | 0 | 5 | 10 | 15 | 20 | 25 | 30 | clean |
| WER (%) | 24.62 | 15.71 | 9.47 | 5.13 | 2.95 | 1.86 | 1.59 | 1.14 |

Figure 5:
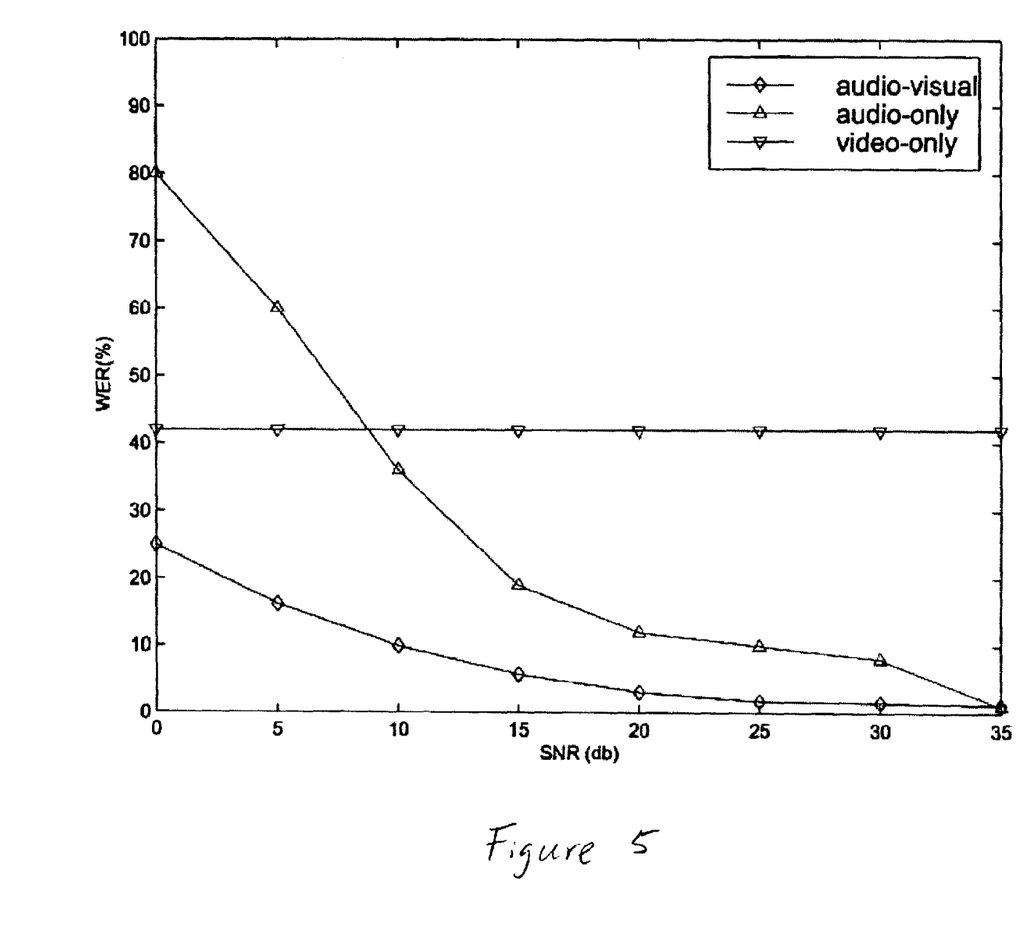
FIG. 5 is a diagram illustrating an exemplary word error rate (WER) in accordance with one embodiment.

FIG. 5 shows word error rates of audio-only, visual-only, and audiovisual speech recognition systems at difference levels of SNR. Table 1 and FIG. 5 compare the WER of a current AVSR system with an audio-only speech recognition system. For fair comparison, in the audio-only speech recognition system, all phonemes are modeled using a HMM with the similar characteristics as the audio HMM in the audiovisual CHMM.

Figure 6:
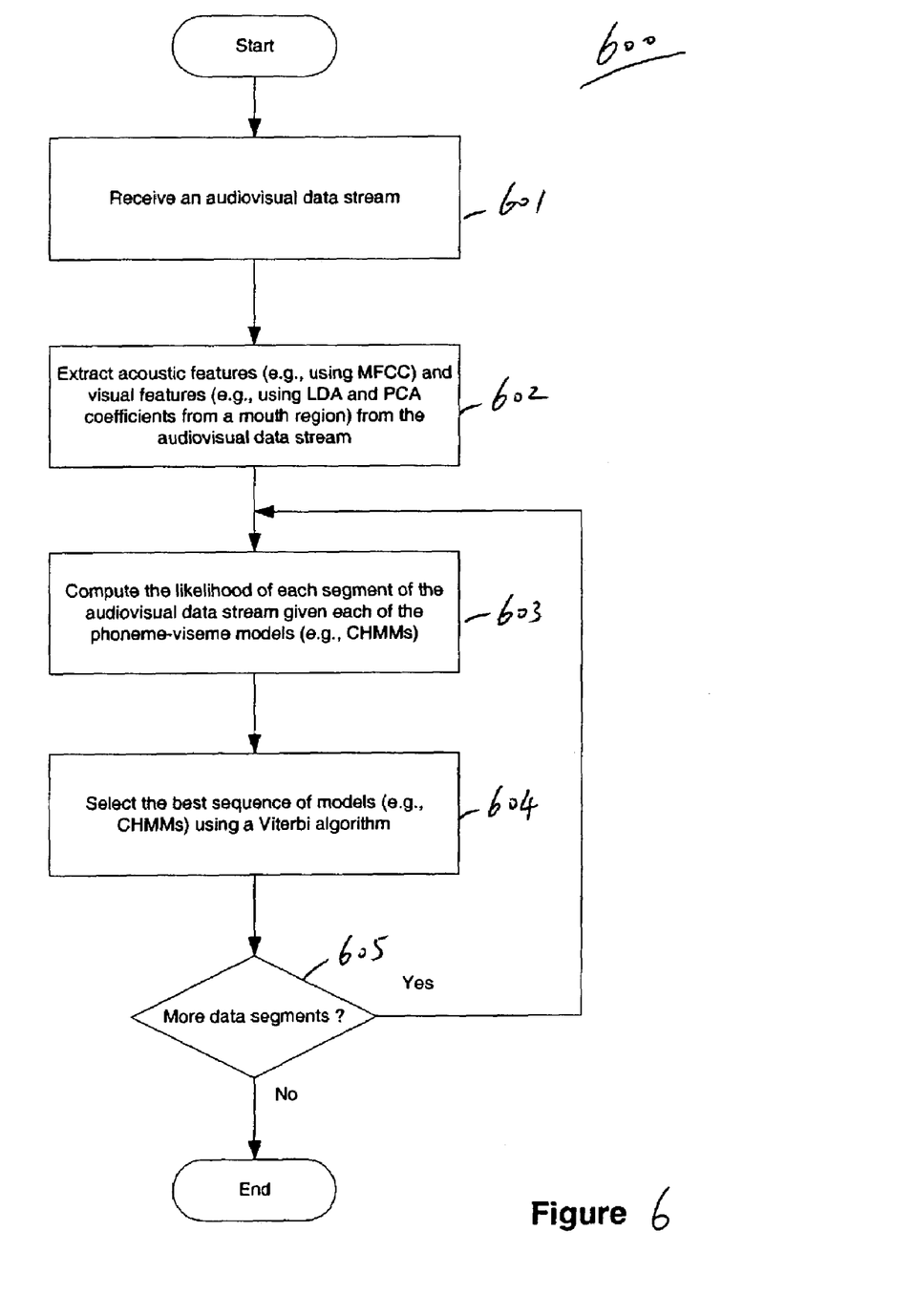
FIG. 6 is a flow diagram illustrating an exemplary embodiment of a process for AVCSR system using a CHMM.

FIG. 6 is a flow diagram illustrating an exemplary embodiment of a process for continuous audiovisual speech recognition using one or more CHMMs. The process may be performed by hardware (e.g., circuitry, dedicated logic, etc.), software (such as programs run on a general purpose computer or a dedicated machine), or a combination of both. In one embodiment, exemplary process 600 includes receiving an audio data stream and a video data stream, and performing continuous speech recognition based on the audio and video data streams using a coupled hidden Markov model (CHMM).

Referring to FIG. 6, at block 601, an audiovisual data stream is received. The audiovisual information may be collected and stored in an analog format, or preferentially, may be converted to a suitable digital form, including but not limited to MPEG-2, MPEG-4, JPEG, Motion JPEG, or other sequentially presentable transform coded images commonly used for digital image storage. Low cost, low resolution CCD (coupled charged device) or CMOS based video camera systems can be used, although video cameras supporting higher frame rates and resolution may be useful for certain applications. Audio data may be acquired by low cost microphone systems and may be subjected to various audio processing techniques to remove intermittent burst noise, environmental noise, static, sounds recorded outside the normal speech frequency range, or any other non-speech data signal.

At block 602, acoustic features are extracted using MFCC extraction and visual features are extracted from the audiovisual data. In one embodiment, visual features are extracted using LDA or/and PCA (principal component analysis) coefficients from a mouth region using one of the aforementioned techniques. At block 603, the likelihood of each segment of the audiovisual data stream given each of the phoneme-viseme models (e.g., CHMMs) is computed. At block 604, the best sequence of models (e.g., CHMMs) is selected through a Viterbi algorithm, as discussed above. If there are more data segments (block 605), the above processing blocks are repeated until all the data segments have been processed.

Figure 7:
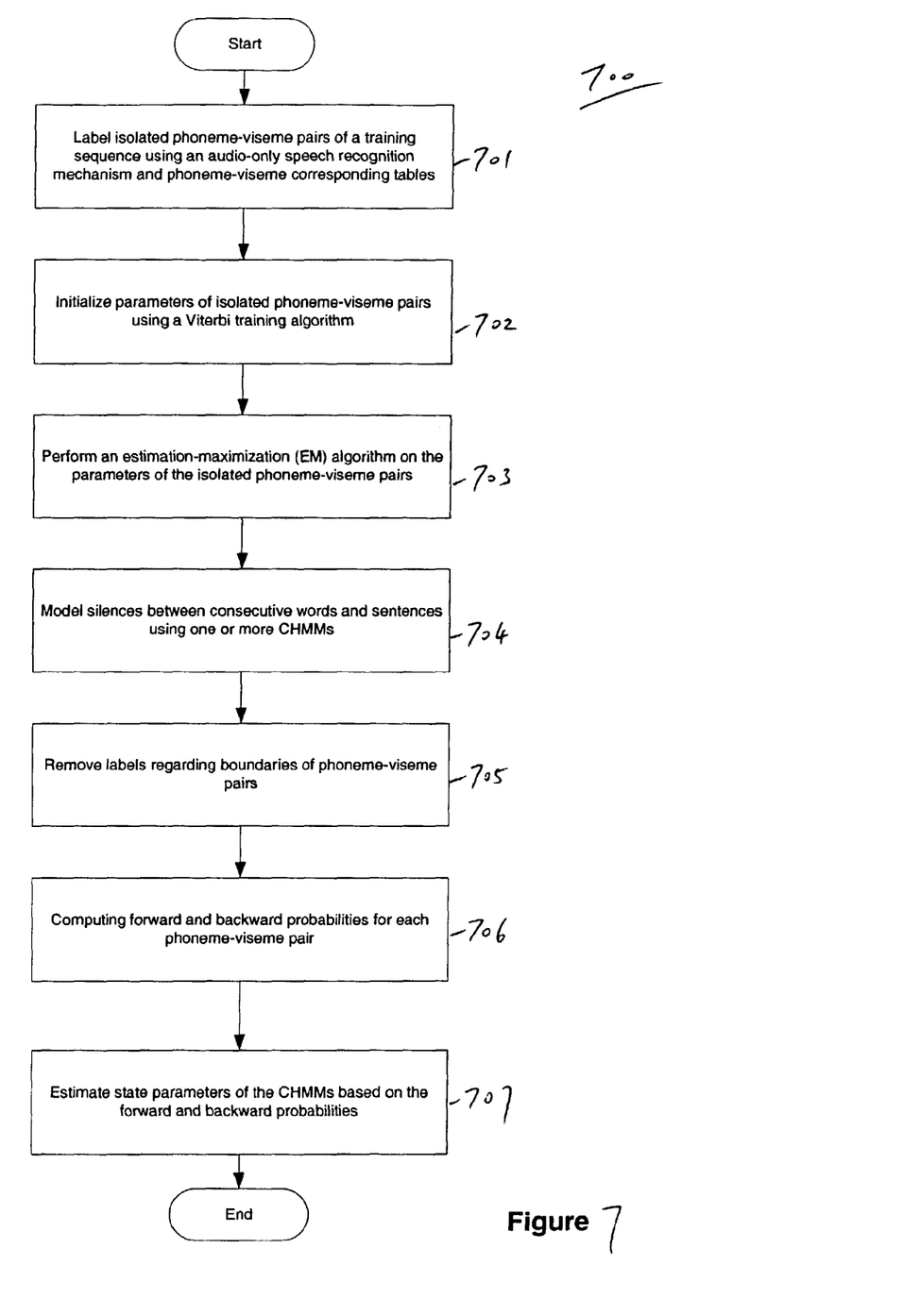
FIG. 7 is a flow diagram illustrating an exemplary embodiment of a process for training parameters of a CHMM.

FIG. 7 is a flow diagram illustrating an exemplary embodiment of a process for training parameters of one or more CHMMs in a continuous audiovisual speech recognition system. The process may be performed by hardware (e.g., circuitry, dedicated logic, etc.), software (such as programs run on a general purpose computer or a dedicated machine), or a combination of both. In one embodiment, exemplary process 700 includes estimating parameters of a coupled hidden Markov model (CHMM) individually based on isolated phoneme-viseme pairs of a training sequence using a Viterbi algorithm, and performing training on the parameters of the CHMM from a continuous audiovisual speech using a Viterbi algorithm.

Referring to FIG. 7, at block 701, isolated phoneme-viseme pairs of a training sequence are labeled using an audio-only speech recognition mechanism and phoneme-viseme corresponding tables. At block 702, parameters of isolated phoneme-viseme pairs are initialized using a Viterbi training algorithm. At block 703, an estimation-maximization (EM) algorithm is performed on the parameters of the isolated phoneme-viseme pairs. At block 704, silences between consecutive words and sentences are modeled using one or more CHMMs. At block 705, labels regarding boundaries of phoneme-viseme pairs are removed. At block 706, forward and backward probabilities are computed for each phoneme-viseme pair. At block 707, state parameters of the CHMMs are re-estimated based on the forward and backward probabilities.

Figure 8:
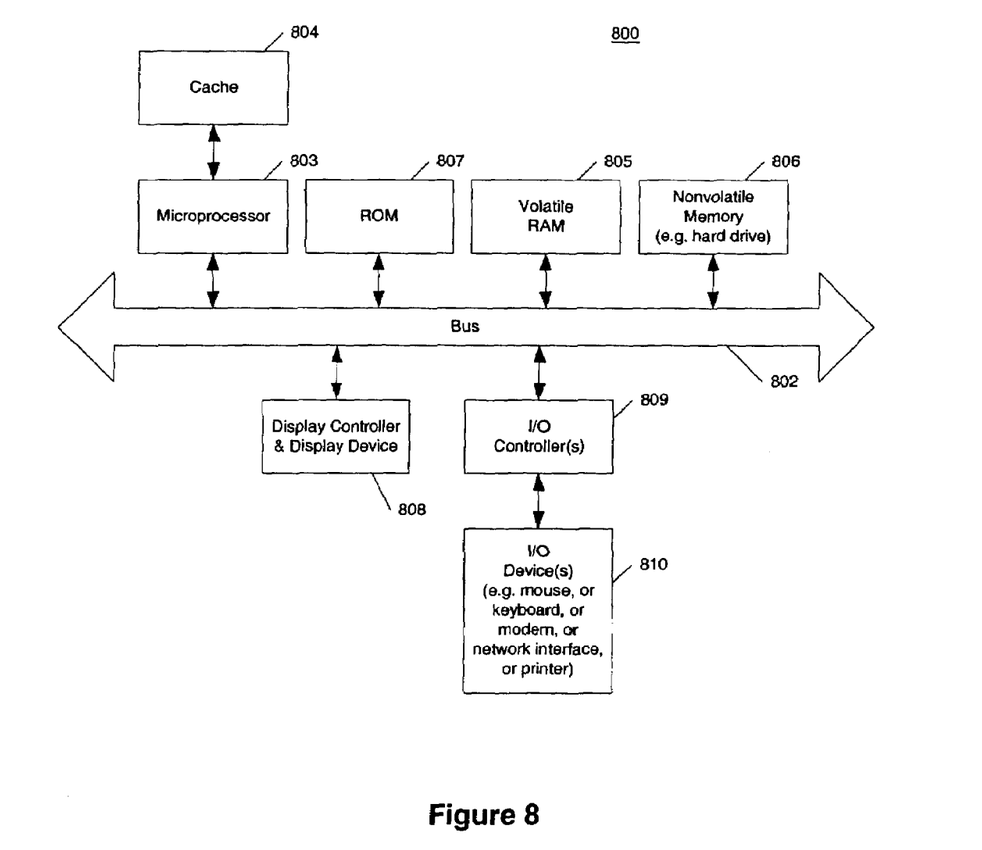
FIG. 8 is a block diagram of an exemplary computer system which may be used with one embodiment.

FIG. 8 shows a block diagram of an exemplary computer which may be used with an embodiment of the invention. For example, system 800 shown in FIG. 8 may include hardware, software, or the both, to perform the above discussed processes shown in FIGS. 6 and 7. Note that while FIG. 8 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention.

As shown in FIG. 8, the computer system 800, which is a form of a data processing system, includes a bus 802 which is coupled to a microprocessor 803 and a ROM 807, a volatile RAM 805, and a non-volatile memory 806. The microprocessor 803, which may be a Pentium processor from Intel Corporation, is coupled to cache memory 804 as shown in the example of FIG. 8. The bus 802 interconnects these various components together and also interconnects these components 803, 807, 805, and 806 to a display controller and display device 808, as well as to input/output (I/O) devices 810, which may be mice, keyboards, modems, network interfaces, printers, and other devices which are well-known in the art. Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 8 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus) adapter for controlling USB peripherals.

Thus, a coupled HMM for audiovisual continuous speech recognition is described. It will be appreciated that accurate audiovisual data to text processing may be used to enable various applications, including provision of robust framework for systems involving human computer interaction and robotics. Accurate speech recognition in high noise environments allows continuous speech recognition under uncontrolled environments, speech command and control devices such as hand free telephones, and other mobile devices. In addition the coupled HMM may be applied to a large number of multimedia applications that involve two or more related data streams such as speech, one or two hand gesture and facial expressions. Furthermore, the coupled HMM may be readily configured to take advantage of the parallel computing, with separate modeling/training data streams under control of separate processors.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
receiving an audio data stream and a video data stream; and
performing continuous speech recognition based on the audio and video data streams using a plurality of hidden Markov models (HMMs) including at least one HMM corresponding to each data stream, the HMM having a coupled node, a mixture node and an observable node, the coupled node and the mixture node being hidden, the coupled node at a time slot being subject to a separate coupled node of a separate HMM of the plurality of HMMs at a preceding time slot, the coupled node at the time slot being not directly subject to any hidden node of the plurality of HMMs at the time slot, the mixture node at the time slot being directly subject to the coupled nodes at the time slot, the mixture node at the time slot being not directly subject to any hidden node of the plurality of HMMs at the preceding time slot and the mixture node being not directly subject to any hidden node outside of the HMM.

2. The method of claim 1, wherein the audio and video data streams have asynchronous states.

3. The method of claim 1, further comprising processing the audio and video data streams in parallel.

4. The method of claim 1, wherein the plurality of HMMs models a phoneme-viseme pair of the audio and video data streams.

5. The method of claim 1, further comprising computing a transition probability of a node based on at least a portion of audio and video data streams jointly.

6. The method of claim 1, further comprising independently computing observation likelihood for the audio and video data streams.

7. The method of claim 1, further comprising training the plurality of HMMs using a Viterbi algorithm.

8. The method of claim 1, further comprising performing visual feature extraction from the video data stream.

9. A method, comprising:
estimating parameters of a plurality of hidden Markov models (HMMs) individually based on isolated phoneme-viseme pairs of a training sequence using a Viterbi algorithm, the HMMs being based on an audio data stream and a video data stream, the HMMs including at least one HMM corresponding to each data stream, the HMM having a coupled node, a mixture node and an observable node, the coupled node and the mixture node being hidden, the coupled node at a time slot being subject to a separate coupled node of a separate HMM of the HMMs at a preceding time slot, the coupled node at the time slot being not directly subject to any hidden node of the HMMs at the time slot, the mixture node at the time slot being directly subject to the hidden coupled nodes at the time slot, the mixture node at the time slot being not directly subject to any hidden node of the HMMs at the preceding time slot and the mixture node being not directly subject to any hidden node outside of the HMM; and
performing training on the parameters of the HMMs from a continuous audiovisual speech using a Viterbi algorithm.

10. The method of claim 9, wherein the estimating parameters comprises labeling the training sequence using an audio-only speech recognition mechanism and phoneme-viseme correspondence tables.

11. The method of claim 9, wherein the estimating parameters comprises performing a Viterbi-based initialization on the parameters of the isolated phoneme-viseme pairs.

12. The method of claim 11, wherein the estimating parameters further comprises performing an estimation-maximization (EM) operation on the parameters of the isolated phoneme-viseme pairs.

13. The method of claim 9, wherein the estimating parameters further comprising modeling silences between consecutive words and sentences using one or more HMMs.

14. The method of claim 9, wherein performing training comprises removing labels regarding boundaries of phoneme-viseme pairs of the training sequence.

15. The method of claim 9, wherein performing training comprises synchronizing the phoneme-viseme pairs at boundaries of HMMs.

16. The method of claim 15, wherein synchronizing the phoneme-viseme pairs comprises associating each of the HMMs with an entry non-emitting state and an exit non-emitting state.

17. The method of claim 9, wherein performing training comprises computing forward and backward probabilities for each phoneme-viseme pair recursively with respect to the training sequence.

18. The method of claim 17, wherein the forward and backward probabilities are computed based on a set of audio and video states of respective phoneme-viseme pair.

19. The method of claim 17, further comprising estimating state parameters of the HMMs based on the forward and backward probabilities.

20. A computer-readable storage medium having executable codes which when executed by one or more data processing systems cause said systems to perform a method, the method comprising:
receiving an audio data stream and a video data stream; and
performing continuous speech recognition based on the audio and video data streams using a plurality of hidden Markov models (HMMs) including at least one HMM corresponding to each data stream, the HMM having a coupled node, a mixture node and an observable node, the coupled node and the mixture node being hidden, the coupled node at a time slot being subject to a separate coupled node of a separate HMM of the plurality of HMMs at a preceding time slot, the coupled node at the time slot being not directly subject to any hidden node of the plurality of HMMs at the time slot, the mixture node at the time slot being directly subject to the coupled node at the time slot, the mixture node at the time slot being not directly subject to any hidden node of the plurality of HMMs at the preceding time slot and the mixture node being not directly subject to any hidden node outside of the HMM.

21. The computer-readable storage medium of claim 20, wherein the method further comprises computing a transition probability of a node based on at least a portion of audio and video data streams jointly.

22. The computer-readable storage medium of claim 20, wherein the method further comprises independently computing observation likelihood for the audio and video data streams.

23. A computer-readable storage medium having executable codes which when executed by one or more data processing systems cause said systems to perform a method, the method comprising:
estimating parameters of a plurality of hidden Markov models (HMMs) individually based on isolated phoneme-viseme pairs of a training sequence using a Viterbi algorithm, the HMMs being based on an audio data stream and a video data stream, the HMMs including at least one HMM corresponding to each data stream, the HMM having a coupled node, a mixture node and an observable node, the coupled node and the mixture node being hidden, the coupled node at a time slot being subject to a separate coupled node of a separate HMM of the plurality of HMMs at a preceding time slot, the coupled node at the time slot being not directly subject to any hidden node of the plurality of HMMs at the time slot, the mixture node at the time slot being directly subject to the coupled nodes at the time slot, the mixture node at the time slot being not directly subject to any hidden node of the plurality of HMMs at the preceding time slot and the mixture node being not directly subject to any hidden node outside of the HMM; and
performing training on the parameters of the HMMs from a continuous audiovisual speech using a Viterbi algorithm.

24. The computer-readable storage medium of claim 23, wherein the estimating parameters comprises performing a Viterbi-based initialization on the parameters of the isolated phoneme-viseme pairs.

25. The computer-readable storage medium of claim 23, wherein performing training comprises synchronizing the phoneme-viseme pairs at boundaries of HMMs.

26. A system, comprising:
a processor; and
a memory coupled to the processor, the memory storing instructions, which when executed by the processor, cause the processor to perform the operations of:
receiving an audio data stream and a video data stream; and
performing continuous speech recognition based on the audio and video data streams using a plurality of hidden Markov models (HMMs) including at least one HMM corresponding to each data stream, the HMM having a coupled node, a mixture node and an observable node, the coupled node and the mixture node being hidden, the coupled node at a time slot being subject to a separate coupled node of a separate HMM of the plurality of HMMs at a preceding time slot, the coupled node at the time slot being not directly subject to any hidden node of the plurality of HMMs at the time slot, the mixture node at the time slot being directly subject to the coupled nodes at the time slot, the mixture node at the time slot being not directly subject to any hidden node of the plurality of HMMs at the preceding time slot and the mixture node being not directly subject to any hidden node outside of the HMM.

27. The system of claim 26, wherein the operations further comprise computing a transition probability of a node based on at least a portion of audio and video data streams jointly.

28. A system, comprising:
a processor; and
a memory coupled to the processor, the memory storing instructions, which when executed by the processor, cause the processor to perform the operations of:
estimating parameters of a plurality of hidden Markov models (HMMs) individually based on isolated phoneme-viseme pairs of a training sequence using a Viterbi algorithm, the HMMs being based on an audio data stream and a video data stream, the HMMs including at least one HMM corresponding to each data stream, the HMM having a coupled node, a mixture node and an observable node, the coupled node and the mixture node being hidden, the coupled node at a time slot being subject to a separate coupled node of a separate HMM of the HMMs at a preceding time slot, the coupled node at the time slot being not directly subject to any hidden node of the HMMs at the time slot, the mixture node at the time slot being directly subject to the coupled node at the time slot, the mixture node at the time slot being not directly subject to any hidden node of the HMMs at the preceding time slot and the mixture node being not directly subject to any hidden node outside of the HMM; and
performing training on the parameters of the HMMs from a continuous audiovisual speech using a Viterbi algorithm.

29. The system of claim 28, wherein the estimating parameters comprises performing a Viterbi-based initialization on the parameters of the isolated phoneme-viseme pairs.

30. The system of claim 28, wherein performing training comprises synchronizing the phoneme-viseme pairs at boundaries of HMMs.

* * * * *